C. BÖHME.
VALVE.
APPLICATION FILED FEB. 2, 1911.
1,004,845.
Patented Oct. 3, 1911.
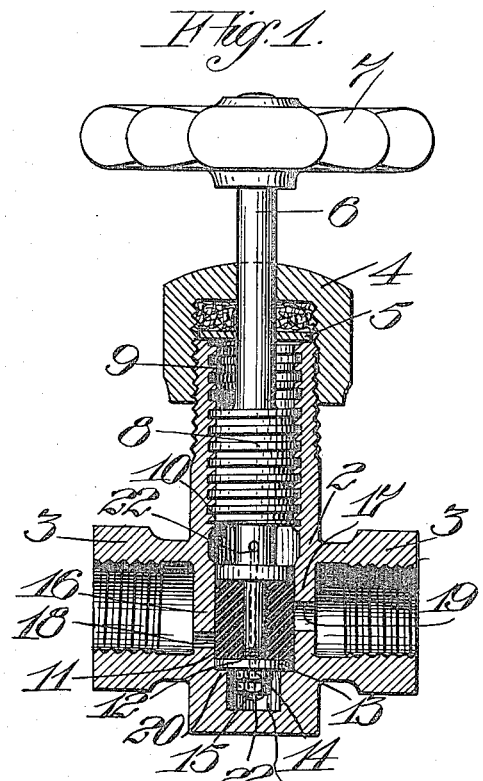
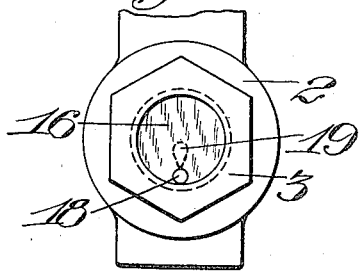
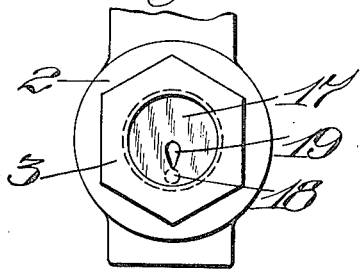
Witnesses
Thos. Castberg
F. E. Maynard.
Inventor
Carl Böhme
by G. H. Strong
his atty

UNITED STATES PATENT OFFICE.

CARL BÖHME, OF SAN FRANCISCO, CALIFORNIA.

VALVE.

1,004,845. Specification of Letters Patent. Patented Oct. 3, 1911.

Application filed February 2, 1911. Serial No. 606,200.

*To all whom it may concern:*

Be it known that I, CARL BÖHME, a subject of the Emperor of Germany, residing in the city and county of San Francisco and State of California, have invented new and useful Improvements in Valves, of which the following is a specification.

This invention relates to valves and particularly to valves for controlling the flow of oil to oil burners.

The object of the present invention is to provide a valve extremely simple in construction, reliable in operation and so designed that the flow of fluid through the valve can be most accurately determined, and which valve involves details of construction rendering it inexpensive in manufacture.

The invention consists of the parts and the combination and construction of parts hereinafter more fully described and claimed, having reference to the accompanying drawings, in which—

Figure 1 is a vertical longitudinal section through the valve. Fig. 2 is a side elevation of the discharge side of the valve. Fig. 3 is a fragmentary detail showing the inlet port of the valve.

The present valve is particularly designed for use in oil burning systems, although it is adaptable for many other purposes and involves a combination of elements of the simplest possible construction to afford a durable, inexpensive, reliable and accurate means for governing the passage of fluids, such as oil.

In the illustrated embodiment of the invention, 2 represents a valve body of suitable material, having transversely projecting internally threaded polygonal ends 3 and an upwardly extending externally threaded cylinder portion whereon may be screwed a bonnet 4, provided with a suitable packing ring 5, and through the bonnet extends a stem 6 having at its upper end a handle 7. The lower portion of the stem 6 is provided with a worm or screw 8 which may have single or multiple threads, preferably of such pitch as to cause the stem to move considerably in the valve body for a given turn of the handle 7. The threads 8 of the valve stem 6 engage internal threads 9 in the sleeve or cylinder of the valve body.

The salient features of the present invention are the specific construction of the ports or passage ways from one end of the valve to the other, and the particular means for interrupting a flow of fluid through these ports, and as here shown, the body of the valve is formed with a cylindrical chamber 10, in which is movable a piston or plug 11, preferably formed of some expansible compressible material, as hard rubber, and which is removably mounted upon the lower reduced spindle 12 of the stem 6 and held thereon by means of a slidably mounted washer 13, and locking nuts 14, which are screwed upon the threaded extremity 15 of the stem 6. The piston 11 has a snug working fit with the walls of the chamber 10, and a portion of these walls form diaphragms 16 and 17, in which are made respectively, an inlet port and an outlet port 18 and 19.

As shown in Fig. 3, the inlet port 18 is formed in the lower portion of the diaphragm 16 and may be circular, or of other suitable outline, and of such area that the fluid passing through the valve may flow in with comparative freedom. The port 19 in the diaphragm 17 is made substantially pear shaped, and has its transverse diameter approximately in the center of the diaphragm 17, with the contracting outline or point of the port being downward. By this specific design of the port 19 and its location, when the piston 11 has been moved upwardly by turning the stem 6 until the lower edge of the piston 11 is carried above the upper portion of the outlet port 19, the full area of this port is exposed and the oil flowing into the inlet port 18 crosses the chamber 10 and flows through the fully opened outlet port 19.

Experience has shown that in oil burning systems, it is desirable to be able to carefully control the volume of oil admitted to the burner or burners, and the valve herein illustrated has been actually constructed and tried, demonstrating its efficiency and reliability.

In use, when it is desired to reduce the volume of oil flowing through the valve, the stem 6 is turned thus moving the piston 11 down across the upper portion of the outlet valve 19, thus reducing the opening through this port, meanwhile leaving the inlet port fully uncovered so that the oil may have free access to the chamber 18, and allowing the oil to reach the outlet port under normal pressure. Further turning of the stem 6 to move down the piston 11 will reduce the area of the outlet port 19 so that a substantial triangular area is exposed through which the fluid runs. Continuing the downward movement of the piston 11 reduces the exposed area of the port 19, so that the finest of streams can be permitted to flow through the port.

When the piston 11 has been moved past the outlet port 19 to close the same, its movement may be continued until it covers the inlet port 18, soon after which the washer 13 below the piston 11 will be carried into contact with a seat 20 formed in the lower portion of the chamber 10 and when the valve stem 6 is further revolved, the compressing of the flexible piston 11 by the seated washer 13 causes it to expand and hermetically seal the inlet and outlet ports 18 and 19. In order to allow such fluid as may be contained in the cylinder adjacent the seat 20 to escape and permit the washer 13 to be seated, the lower portion of the stem 6 is centrally chambered as at 21, and through this chamber the fluid may flow upwardly and escape through a port 22 formed in the stem 6 above the upper end of the piston 11. When the stem 6 is turned to lift the valve or piston 11 to open the ports 18 and 19, the fluid may pass inwardly through the port 22 and chamber 21 to that portion of the chamber 10 adjacent the seat 20.

Having thus described my invention, what I claim and desire to secure by Letters Patent is—

1. A valve comprising a body portion having transversely extended internally threaded pipe receiving ends and a cylindrical portion having internal threads, said cylindrical portions comprising diaphragms within the body portion, said diaphragms being provided with ports arranged out of line to allow the discharge port to be wholly or partially closed while the inlet port remains fully open, a handled stem having a threaded portion fitting the interior threads of the cylindrical portion of the valve body and a cylindrical flexible plug mounted on the lower portion of said stem fitting the interior of the said cylindrical portion and adapted to close the ports by sliding crosswise thereof.

2. A valve comprising a pipe receiving body portion having a cylindrical chamber, said chamber comprising diaphragms within the valve body, one of said diaphragms being provided with a port in the lower portion thereof, the other of said diaphragms being provided with a pear shaped port which is out of line with the first named port, the larger area of which port is approximately in the center of the diaphragm, and a piston movable in said chamber crosswise of the ports and adapted to control the flow through said ports.

3. A valve comprising a pipe receiving body portion having a cylindrical chamber, said chamber comprising diaphragms within the valve body, one of said diaphragms being provided with a port in the lower portion thereof, the other of said diaphragms being provided with a pear shaped port which is out of line with the first named port, the larger area of which port is approximately in the center of the diaphragm, and a piston movable in said chamber crosswise of the ports and adapted to control the flow through said ports, said piston being composed of an expansible material.

4. A valve comprising a pipe receiving body portion having a cylindrical chamber, said chamber comprising diaphragms within the valve body, one of said diaphragms being provided with a port in the lower portion thereof, the other of said diaphragms being provided with a pear shaped port which is out of line with the first named port, the larger area of which port is approximately in the center of the diaphragm, and a piston movable in said chamber crosswise of the ports and adapted to control the flow through said ports, said piston being composed of an expansible material, and a seat formed in the lower portion of the cylindrical chamber.

5. A valve comprising a pipe receiving body portion having a cylindrical chamber, said chamber comprising diaphragms within the valve body, one of said diaphragms being provided with a port in the lower portion thereof, the other of said diaphragms being provided with a pear shaped port which is out of line with the first named port, the larger area of which port is approximately in the center of the diaphragm, a piston movable in said chamber crosswise of the ports and adapted to control the flow through said ports, said piston being composed of an expansible material, a seat formed in the lower portion of the cylindrical chamber, and a washer located against one end of said piston adapted to abut said seat.

6. A valve comprising a body portion having pipe receiving ends, a cylindrical portion internally chambered, the walls of said cylindrical portion comprising diaphragms within the valve body, one of said diaphragms having a port in the lower portion thereof; other of said diaphragms having a port located approximately central of the diaphragm, a bonnet for said cylindrical portion, a stem, an expansible piston mounted upon said stem, a seat located adjacent the bottom of the cylindrical valve chamber, and a washer loosely mounted on said stem adjacent one end of said expansible piston, adapted to engage said seat, said valve stem and the interior of the valve body having engaging threaded portions whereby the expansible piston may be compressed.

In testimony whereof I have hereunto set my hand in the presence of two subscribing witnesses.

CARL BÖHME.

Witnesses:
F. B. SCHOENSTEIN,
CHARLES EDELMAN.